(No Model.)
T. J. RASHLEIGH & J. HERN.
SANITARY UTENSIL.
No. 496,097. Patented Apr. 25, 1893.
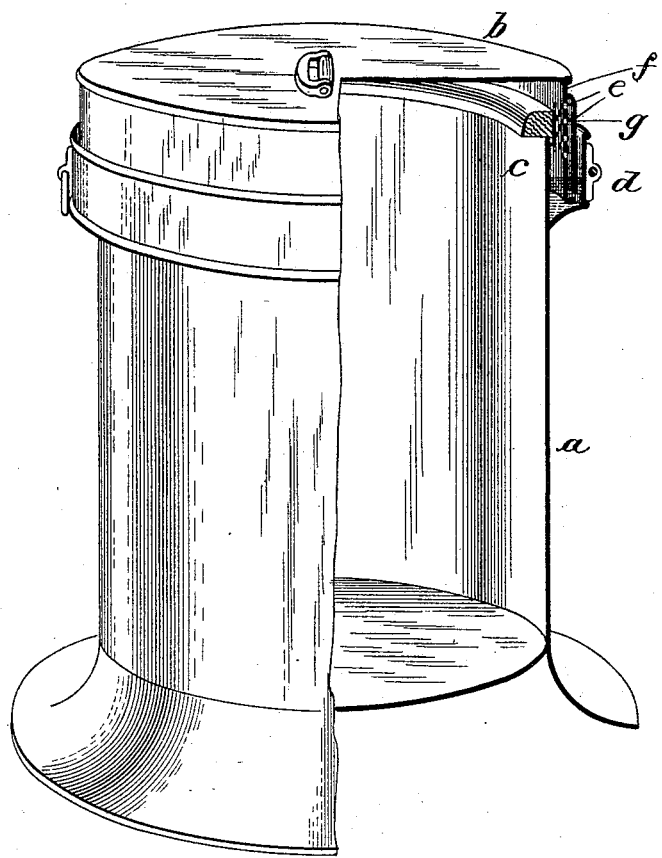
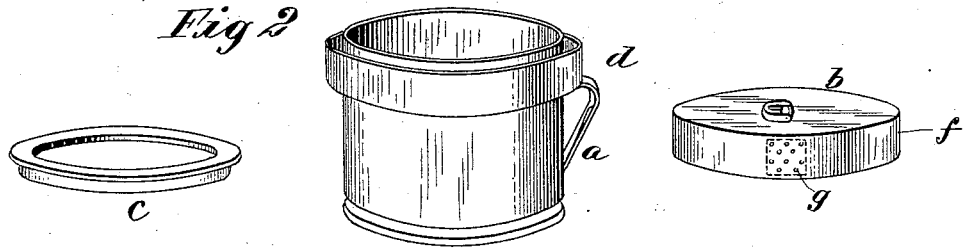

UNITED STATES PATENT OFFICE.

THEODORE JOSHUA RASHLEIGH, OF HAWTHORN, AND JOHN HERN, OF MELBOURNE, VICTORIA.

SANITARY UTENSIL.

SPECIFICATION forming part of Letters Patent No. 496,097, dated April 25, 1893.

Application filed January 7, 1893. Serial No. 457,613. (No model.)

*To all whom it may concern:*

Be it known that we, THEODORE JOSHUA RASHLEIGH, residing at 266 Barker's Road, Hawthorn, near Melbourne, and JOHN HERN, residing at 30 Bourke Street, Melbourne, Colony of Victoria, subjects of the Queen of Great Britain and Ireland, have invented certain new and useful Improvements in Sanitary Utensils; and we do declare the following to be a full, clear, and exact description of the same, such as will enable others skilled in the art to which it appertains to make and use the same.

This invention relates to that class of sanitary utensils that can be hermetically sealed, thus preventing the escape of any objectionable odors or gases.

The object of our invention is to produce a more effective and efficient device than has heretofore been used.

A further object is to so construct the utensil that the sealing of the same may be performed with little or no trouble.

A still further object is to construct a utensil that will be neat in appearance yet effective in operation.

With such objects as the above in view, our invention consists in the peculiarities of construction and arrangement and combinations of parts as will be more fully described hereinafter and pointed out in the claims.

In the accompanying drawings: Figure 1 represents a perspective view of a vessel provided with our improvements, parts of said view being broken away to better show the construction. Fig. 2 shows a perspective view of a bed-room vessel provided with our improvement.

The reference letter *a* represents the body of a vessel, adapted to receive the removable top or lid *b*, which fits down upon the outside of the vessel. Upon the top edge of the vessel a seat *c* is adapted to rest. Upon the outside of the vessel and just below its upper edge, is secured a liquid receptacle *d*. This receptacle extends entirely around the vessel and forms a moat into which the lower edge of the lid or top *b* is adapted to fit. Air passages *e* are punctured in the side *f* of the top *b* and these holes are protected from direct contact with the outside air by a plate *g* secured to the side and extending parallel therewith. An air passage is left between the plate *g* and side *f* of the top, or lid *b*. This passage is open at the bottom only, for the plate is shorter than the side *f*, and by means of it and the holes *e*, air is permitted to enter the interior of the top or lid *b*, thereby preventing the agitation of the liquid in the receptacle *d*, when the cover is being removed. Such a construction prevents the water or liquid in the receptacle slopping over the edges. Water is preferably used as a sealing agent, for it is inexpensive and as effective as any other liquid.

Our method is especially applicable where dry closets are used, for it will be seen that they can be sealed with little trouble and expense, thus preventing offensive odors and often disease.

Having thus described our invention, what we claim as new, and desire to secure by Letters Patent, is—

1. A vessel provided with a receptacle near its upper exterior edge, said receptacle extending entirely around the vessel, a lid adapted to fit over the top of the vessel, and air passages in the sides of the lid, whereby agitation of the liquid in the receptacle is avoided when removing the top or lid, substantially as described.

2. A vessel provided with a receptacle extending entirely around and located near its upper edge, a cover or lid fitting over the top of the vessel and entering the receptacle, and shielded air passages in said cover whereby the slopping of the liquid in the receptacle is prevented when the cover is being removed, substantially as specified.

In witness whereof we have hereunto set our hands in the presence of two subscribing witnesses.

THEODORE JOSHUA RASHLEIGH.
JOHN HERN.

Witnesses:
G. G. TURRI,
   *Patent Solicitor, Melbourne.*
E. NICHOLLS.
   *Clerk to G. G. Turri.*